T. M. FELL.

Improvement in Carbureting Illuminating-Gas.

No. 131,157. Patented Sep. 10, 1872.

Witnesses
Q. W. Parker
John Pearce

Inventor
Thomas Maro Fell, C.E.

UNITED STATES PATENT OFFICE.

THOMAS MARA FELL, OF BROOKLYN, NEW YORK.

IMPROVEMENT IN CARBURETING ILLUMINATING GAS.

Specification forming part of Letters Patent No. 131,157, dated September 10, 1872.

SPECIFICATION.

I, THOMAS MARA FELL, of the city of Brooklyn, county of Kings and State of New York, have invented an improved apparatus or method of carbonizing common street gas, atmospheric air, oxygen or hydrogen gases, thereby producing a superior illuminating gas, such method or apparatus being now termed the Fell carbureter, of which the following is a specification:

In my apparatus the air or gas to be carbureted is passed through a range of tubes that is above the hydrocarbon liquid, and connected with the tubes in this range are numerous vertical pipes containing wicking or similar absorbent, and passing down into the gasoline or other liquid hydrocarbon. As the air or gas passes through the pipes of this range its movement aids in speading the liquid upon the insides of the tubes, and hence the hydrocarbon liquid is vaporized and passes on with the air or gas, and the liquid being absorbed from the lower portion of the vessel, where the hydrocarbon is least volatile, the carbureting operation is rendered very uniform.

Figure 1:
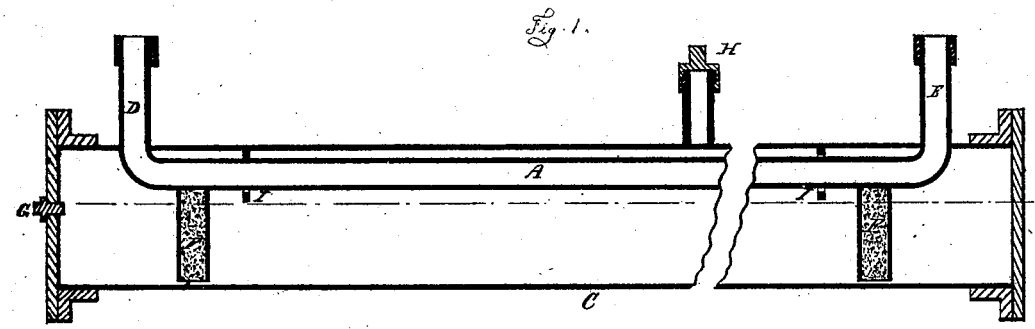
Figure 2:
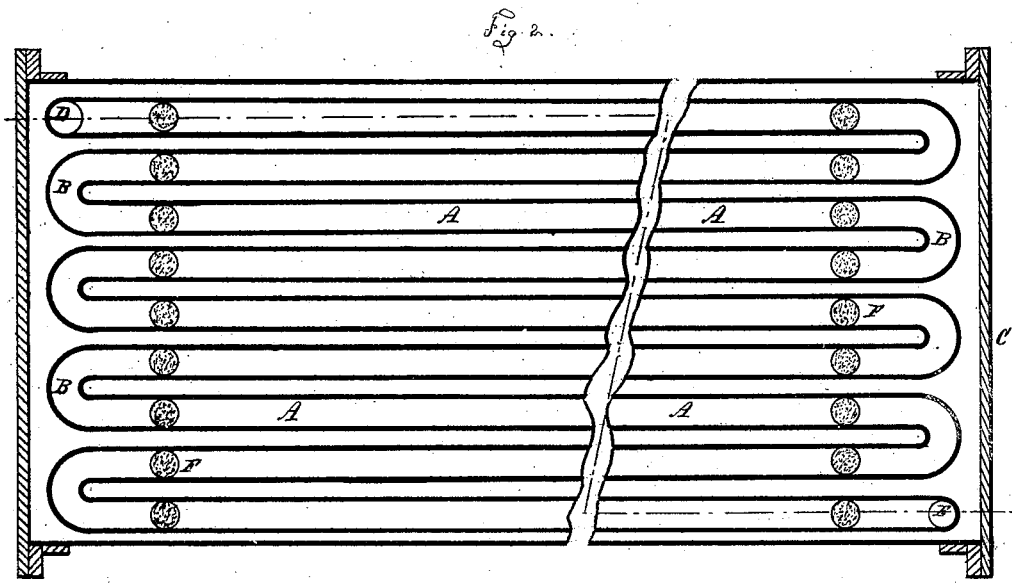
Figure 3:
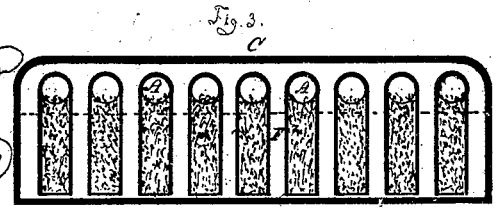

In the drawing, Figure 1 is a plan of the carbureting-pipes. Fig. 2 is a vertical cross-section, and Fig. 3 is a vertical longitudinal section of the apparatus.

The vessel C receives the hydrocarbon liquid through filling-plug H, and G is a cock to indicate the proper level of the liquid. The range of pipes A are sustained near the top of the case, and the pipes are connected at alternate ends by the thimbles B, the air or gas to be carbureted entering at D and passing off at E to a holder or burner. The vertical tubes $f$ are open at their lower ends, and at their upper ends are connected to the tubes A; and the cotton or other absorbent draws up the liquid hydrocarbon from near the bottom of the vessel C and supplies the same to the pipes A, so that such liquid is spread upon the interior surfaces of the tubes A by capillary attraction, aided by the velocity of the air or gas passing through the tubes A, and, presenting a large surface, is evaporated and conveyed with the air or gas to the holder or burner in the form of an illuminating gas.

I claim as my invention—

The range of tubes A, to which are connected the vertical tubes $f$ containing absorbent material, in combination with the vessel C, supply-cap H, and receiving and delivering tubes D E, substantially as and for the purposes specified.

THOMAS MARA FELL.

Witnesses:
A. W. PARKER,
JOHN PEARCE.